United States Patent
Kurashige et al.

(10) Patent No.: US 7,301,154 B2
(45) Date of Patent: Nov. 27, 2007

(54) INORGANIC SCINTILLATOR

(75) Inventors: Kazuhisa Kurashige, Hitachinaka (JP); Naoaki Shimura, Hitachinaka (JP); Hiroyuki Ishibashi, Tsukuba (JP); Keiji Sumiya, Tsukuba (JP); Tatsuya Usui, Hitachinaka (JP); Shigenori Shimizu, Tsukuba (JP)

(73) Assignee: Hitachi Chemical Co., Ltd., Tokyo (JP)

(*) Notice: Subject to any disclaimer, the term of this patent is extended or adjusted under 35 U.S.C. 154(b) by 143 days.

(21) Appl. No.: 11/154,537

(22) Filed: Jun. 17, 2005

(65) Prior Publication Data

US 2005/0279944 A1   Dec. 22, 2005

(30) Foreign Application Priority Data

Jun. 18, 2004 (JP) ............ P2004-181517

(51) Int. Cl.
G01T 1/20 (2006.01)
(52) U.S. Cl. .................................. 250/370.11
(58) Field of Classification Search ........... 250/370.11, 250/361 R, 362; 252/301.4, 301.4 F
See application file for complete search history.

(56) References Cited

U.S. PATENT DOCUMENTS 5,264,154 A * 11/1993 Akiyama et al. ..... 252/301.4 F
6,278,832 B1 * 8/2001 Zagumennyi et al. ....... 385/141
2005/0253072 A1 * 11/2005 Chai ...................... 250/361 R

FOREIGN PATENT DOCUMENTS

| JP | 62-8472 | 2/1987 |
| JP | 7-78215 | 8/1995 |
| JP | 2001-524163 | 11/2001 |

* cited by examiner

Primary Examiner—David Porta
Assistant Examiner—Djura Malevic
(74) Attorney, Agent, or Firm—Antonelli, Terry, Stout & Kraus, LLP.

(57) ABSTRACT

The inorganic scintillator of the invention is an inorganic scintillator capable of producing scintillation by radiation, which is a crystal comprising a metal oxide containing Lu, Gd, Ce and Si and belonging to space group C2/c monoclinic crystals, and which simultaneously satisfies the conditions specified by the following inequalities (1) and (2).

$$\{A_{Lu}/(A_{Lu}+A_{Gd})\} < 0.50 \quad (1)$$

$$\{A_{Ce}/(A_{Lu}+A_{Gd})\} \geq 0.002 \quad (2)$$

wherein $A_{Lu}$ represents the number of Lu atoms in the crystal, $A_{Gd}$ represents the number of Gd atoms in the crystal, and $A_{Ce}$ represents the number of Ce atoms in the crystal.

7 Claims, 5 Drawing Sheets

US 7,301,154 B2

INORGANIC SCINTILLATOR

BACKGROUND OF THE INVENTION

1. Field of the Invention

The present invention relates to an inorganic scintillator.

2. Related Background of the Invention

In an apparatus used for Positron Emission (computed) Tomography (hereinafter, "PET"), the optical characteristics (wavelength conversion characteristics, etc.) of the scintillator mounted therein has a major effect on the imaging performance of the apparatus, and therefore improvement in the optical characteristics of the scintillator is the most important factor for enhancing the imaging performance of such apparatuses. Researchers are therefore actively exploring scintillator materials which can be used to construct scintillators with excellent optical characteristics, and are developing manufacturing techniques such as crystal growth techniques for realizing such scintillators.

In the field of high-energy physics as well, experiments for detection and analysis of high-energy microparticles arriving to earth from outer space require implementation of scintillators which allow efficient detection of high-energy microparticles.

Scintillators mounted in PET apparatuses include those which require high fluorescent output, those which require short fluorescent decay times and those which require high energy resolution. Particularly from the standpoint of relieving the burden on subjects being examined by PET, the examination time per subject must be shortened and therefore scintillators with short fluorescent decay times are desired.

The time-dependent change in outputted fluorescent pulse intensity for a radiation pulse entering a scintillator will now be explained. FIG. 1 is a graph schematically showing a typical time-dependent change in fluorescent pulse intensity. The fluorescent pulse intensity rises relatively steeply up to the maximum value $I_{max}$, and decays thereafter. Throughout the present specification, the term "fluorescent lifetime" will be used to refer to the time from point (0) at which the intensity of outputted fluorescence is at 10% of the maximum value ($I_{max}$) (0.1 $I_{max}$), to the point at which fluorescence is no longer observed. The phrase "time integrated value of the fluorescent pulse intensity" will mean the time integrated value of the fluorescent pulse intensity from the point at which the fluorescent intensity is at $I_{max}$ ($t_{max}$) to the point at which fluorescence is no longer observed (the shaded section in FIG. 1).

As scintillators designed for shorter fluorescent decay times there are known, for example, inorganic scintillators having a construction comprising Ce (cerium) as a luminescent center in a matrix material composed of a compound metal oxide containing a lanthanoid (for example, see Japanese Examined Patent Publication No. 62-8472). Examples of known inorganic scintillators include scintillators having a chemical composition represented by the general formula: $Ce_\alpha Ln_{2-\alpha}SiO_5$ or the general formula: $Ce_\beta Ln_{2-\beta}AlO_3$, where $0<\alpha<0.1$, $0<\beta<0.1$, and Ln (lanthanoid) represents Sc (scandium), Y (yttrium), La (lanthanum), Gd (gadolinium) or Lu (lutetium).

In particular, scintillators having a chemical composition represented by the general formula: $Ce_\alpha Ln_{2-\alpha}SiO_5$ have high fluorescent output and are therefore widely employed for PET. As specific examples of such inorganic scintillators there may be mentioned "ALLEGRO™" by Philips Medical Systems which employs $Ce_\alpha Gd_{2-\alpha}SiO_5$ and "ECAT ACCEL™" by Siemens which employs $Ce_\alpha Lu_{2-\alpha}SiO_5$.

Japanese Examined Patent Publication No. 7-78215 discloses a single-crystal scintillator represented by the general formula: $Ce_\alpha(Lu_\gamma Gd_{2-\gamma})_{2-\alpha}SiO_5$. Also, in Japanese Patent Application Laid-Open No. 2001-524163 (also in Journal of Crystal Growth 174(1997), p. 331-336) it is attempted to reduce the Lu content ratio by including Ta (tantalum), W (tungsten), Ca (calcium) and F (fluorine) in a single-crystal scintillator represented by $Ce_\alpha(Lu_\gamma Gd_{2-\gamma})_{2-\alpha}SiO_5$.

SUMMARY OF THE INVENTION

However, when the present inventors conducted a detailed examination of conventional inorganic scintillators including those described in the aforementioned publications, it was found that the inorganic scintillator described in Japanese Examined Patent Publication No. 62-8472 composed of $Ce_\alpha Gd_{2-\alpha}SiO_5$ has a slow rise in fluorescence (fluorescent intensity) output from the scintillator after radiation absorption, and therefore the energy (fluorescent intensity) time resolution is insufficiently high. Also, it has been demonstrated that the scintillator composed of $Ce_\alpha Lu_{2-\alpha}SiO_5$ generates considerable noise in the fluorescence outputted upon incidence of charged particles from a subject. This noise lowers the detection precision of the charged particles from the subject, resulting in unsatisfactory energy (fluorescent intensity) time resolution.

The present inventors have also discovered that the scintillator composed of $Ce_\alpha(Lu_\gamma Gd_{2-\gamma})_{2-\alpha}SiO_5$ as described in Japanese Examined Patent Publication No. 7-78215 tends to have a notably inhibited scintillator function when the Lu content ratio is relatively high, as compared to when the Lu content ratio is relatively low. More specifically, a relatively high Lu content ratio lowers the energy (fluorescent intensity) time resolution.

It has also been shown that the scintillator described in Japanese Patent Application Laid-Open No. 2001-524163 does not permit adequate reduction in the noise effect even when Ta, W, Ca and F are included, and that this also results in unsatisfactory energy (fluorescent intensity) time resolution.

The present invention has been accomplished in light of these circumstances, and its object is to provide an inorganic scintillator with a satisfactorily high energy (fluorescent intensity) time resolution.

It has long been known that, depending on the type of constituent material of an inorganic scintillator, the fluorescent output resulting from incident radiation often contains a plurality of fluorescent components with different fluorescent lifetimes. For example, the $Ce_\alpha Ln_{2-\alpha}SiO_5$ described in the aforementioned publications often contain two fluorescent components with different fluorescent lifetimes.

As a result of much diligent research conducted from the viewpoint of the fluorescent components in an inorganic scintillator comprising $Ce_\alpha Ln_{2-\alpha}SiO_5$, with the aim of achieving the object stated above, the present inventors have discovered that the scintillator comprising $Ce_\alpha Gd_{2-\alpha}SiO_5$ described in Japanese Examined Patent Publication SHO No. 62-8472 outputs two fluorescent components with different fluorescent lifetimes, and that the ratio of the fluorescent lifetimes is essentially constant regardless of the Ce content ratio.

For example, the present inventors have confirmed that, for an inorganic scintillator comprising $Ce_{0.005}Gd_{1.995}SiO_5$, the fluorescent component with the shorter fluorescent lifetime has a lifetime of about 56 nanoseconds while the fluorescent component with the longer fluorescent lifetime has a lifetime of about 600 nanoseconds, with a ratio between these fluorescent lifetimes of approximately 1:10. It was also confirmed that in this type of inorganic scintillator, the time integrated value of the fluorescent pulse intensity of the component with the shorter fluorescent lifetime is about 80% of the total including the time integrated value of the fluorescent pulse intensity of the component with the longer fluorescent lifetime.

On the other hand, the present inventors further discovered that, for an inorganic scintillator comprising $Ce_{0.001}Gd_{1.999}SiO_5$, the fluorescent component with the shorter fluorescent lifetime has a lifetime of about 40 nanoseconds while the fluorescent component with the longer fluorescent lifetime has a lifetime of about 418 nanoseconds, and therefore the ratio between the fluorescent lifetimes is also approximately 1:10 similar to an inorganic scintillator comprising $Ce_{0.005}Gd_{1.995}SiO_5$. In this type of inorganic scintillator, the time integrated value of the fluorescent pulse intensity of the component with the shorter fluorescent lifetime is about 85% of the total including the time integrated value of the fluorescent pulse intensity of the component with the longer fluorescent lifetime.

The present inventors further examined a publicly known inorganic scintillator comprising $Ce_\alpha Lu_{2-\alpha}SiO_5$, and confirmed that the fluorescent pulse outputted from this scintillator is composed of a single fluorescent component (fluorescent lifetime: approximately 40 nanoseconds).

As a result of still further detailed examination, the present inventors found that inorganic scintillators comprising metal oxides including Lu, Gd, Ce and Si (silicon) differ from those comprising $Ce_\alpha Lu_{2-\alpha}SiO_5$ in that the fluorescent pulse outputted upon incidence of a radiation pulse is composed of two fluorescent components with different fluorescent lifetimes. It was also demonstrated that the pulse form of the fluorescent pulse depends on the Ce content ratio of the inorganic scintillator. Still deeper examination by the present inventors revealed that inorganic scintillators comprising metal oxides including Lu, Gd, Ce and Si differ from scintillators comprising $Ce_\alpha Gd_{2-\alpha}SiO_5$ in that increasing the Ce content ratio slightly lengthens the lifetime of the fluorescent component with the shorter fluorescent lifetime, whereas the fluorescent component with the longer fluorescent lifetime shortens, roughly in inverse proportion to the Ce content ratio.

In order to achieve the object stated above, the present inventors conducted much diligent research from the viewpoint of the crystalline structure, and discovered that the problem discussed above can be overcome by reducing the Lu in inorganic scintillators comprising metal oxides including Lu, Gd, Ce and Si to a prescribed ratio, and by forming the single crystal of the inorganic scintillator so that it has a crystal structure belonging to a prescribed space group.

More specifically, the present inventors discovered that when the crystalline structures of inorganic scintillators which are crystals comprising metal oxides including Lu, Gd, Ce and Si belong to the space group C2/c, the fluorescence rise time upon absorption of radiation is drastically shorter compared to the space group $P2_1/c$. Here, the "fluorescence rise time" is the time (t) required to rise from the point at which the intensity of outputted fluorescence is at 10% of the maximum value ($I_{max}$) (0.1 $I_{max}$), to the point at which it is at 90% (0.9 $I_{max}$) (see FIG. 1), when a scintillator absorbs a radiation pulse.

The present inventors additionally discovered that when the Lu content ratio is high in an inorganic scintillator as a crystal comprising a metal oxide including Lu, Gd, Ce and Si, since Lu includes approximately 2.6% of its radioactive isotope $^{176}Lu$ as the natural abundance ratio, the natural radiation of beta decay entering the scintillator is a cause of fluorescent noise outputted by the scintillator. The present inventors completed this invention after much additional research based on this finding.

The inorganic scintillator of the present invention is an inorganic scintillator capable of producing scintillation by radiation, which is a crystal comprising a metal oxide containing Lu, Gd, Ce and Si and belonging to space group C2/c monoclinic crystals, and by simultaneously satisfying the conditions specified by the following inequalities (1) and (2).

$$\{A_{Lu}/(A_{Lu}+A_{Gd})\}<0.50 \quad (1)$$

$$\{A_{Ce}/(A_{Lu}+A_{Gd})\}\geq 0.002 \quad (2)$$

In inequalities (1) and (2), $A_{Lu}$ represents the number of Lu atoms in the crystal, $A_{Gd}$ represents the number of Gd atoms in the crystal, and $A_{Ce}$ represents the number of Ce atoms in the crystal.

From the standpoint of more reliably achieving the effect of the invention, the inorganic scintillator of the invention preferably satisfies the condition specified by the following inequality (3).

$$0.005\leq\{A_{Ce}/(A_{Lu}+A_{Gd})\}\leq 0.02 \quad (3)$$

The inorganic scintillator of the invention is also an inorganic scintillator capable of producing scintillation by radiation, which comprises a metal oxide containing Lu, Gd, Ce and Si, by outputting a fluorescent pulse, upon incidence of a radiation pulse to the inorganic scintillator, which is composed of a first fluorescent component exhibiting a fluorescent lifetime τ1 and a second fluorescent component exhibiting a fluorescent lifetime τ2 which is longer than the fluorescent lifetime τ1, and by simultaneously satisfying the conditions specified by the following inequalities (1) and (4).

$$\{A_{Lu}/(A_{Lu}+A_{Gd})\}<0.50 \quad (1)$$

$$(\tau 2/\tau 1)\leq 8 \quad (4)$$

In inequality (1), $A_{Lu}$ represents the number of Lu atoms in the crystal, and $A_{Gd}$ represents the number of Gd atoms in the crystal.

When the outputted fluorescent pulse comprises two fluorescent components with different fluorescent lifetimes as described above, the fluorescent components may be resolved by the method explained below.

When the outputted fluorescent pulse comprises two fluorescent components with different fluorescent lifetimes as described above, the fluorescent intensity I is represented by the following formula (A).

$$I=I_{max}(ae^{-(t-t_{max})/\tau 1}+(1-a)e^{-(t-t_{max})/\tau 2}) \quad (A)$$

In formula (A), I represents the fluorescent intensity, "a" represents a variable, $t_{max}$ represents the time for the fluorescent intensity to reach $I_{max}$, and t represents the time elapsed from $t_{max}$. The variables $I_{max}$, τ1 and τ2 are the same as explained above.

For formula (A), the value represented by the following formula (B) is the fluorescent intensity $I_1$ of the first fluorescent component, and the value represented by the following formula (C) is the fluorescent intensity $I_2$ of the second fluorescent component.

$$I_1=I_{max}ae^{-(t-t_{max})/\tau 1} \quad (B)$$

$$I_2=I_{max}(1-a)e^{-(t-t_{max})/\tau 2} \quad (C)$$

FIG. 2 is a graph schematically showing typical time-dependent change in intensity of a fluorescent pulse composed of two fluorescent components with different fluorescent lifetimes. The curve shown as the solid line (a) represents the time-dependent change in the fluorescent intensity I, the curve shown as the alternating dot-dash line (b) represents the time-dependent change in the fluorescent intensity $I_1$, and the curve shown as the alternating two dot-dash line (c) represents the time-dependent change in the fluorescent intensity $I_2$.

By fitting the obtained fluorescent pulse waveform (solid line (a) in FIG. 2) using formula (A) above, it is possible to resolve each of the fluorescent components. In this case, the fitting is accomplished by optimizing a, τ1 and τ2 according to the least square method.

From the viewpoint of more reliably achieving the effect of the invention, the inorganic scintillator of the invention preferably satisfies the conditions specified by the following inequality (5).

$$(\tau 2/\tau 1) \leq 4 \qquad (5)$$

From the same viewpoint, the inorganic scintillator of the invention preferably satisfies the condition specified by the following inequality (6) and more preferably satisfies the condition specified by the following inequality (7), where S is the time integrated value of the intensity of the fluorescent pulse as a whole, S1 is the time integrated value of the first fluorescent component intensity and S2 is the time integrated value of the second fluorescent component intensity.

$$\{(S1+S2)/S\} \geq 0.90 \qquad (6)$$

$$0.10 \leq \{S1/(S1+S2)\} \leq 0.90 \qquad (7)$$

The crystalline form of the inorganic scintillator of the invention is preferably a single crystal, since this will allow excellent scintillation properties to be achieved more reliably.

According to the invention, it is possible to provide an inorganic scintillator with satisfactorily high energy time resolution.

The inorganic scintillator of the invention may be utilized as a scintillator mounted in a PET apparatus, a scintillator for high-energy physics research, or the like.

DESCRIPTION OF THE PREFERRED EMBODIMENTS

Figure 1:
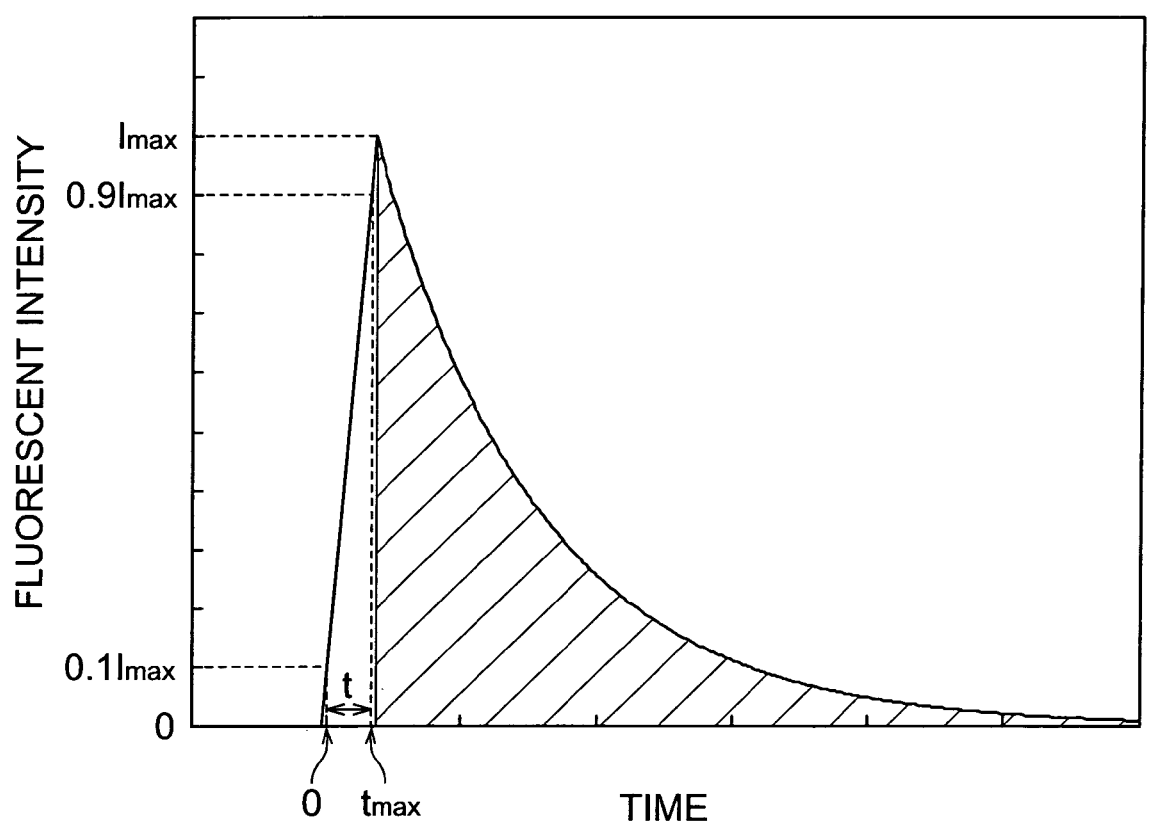
FIG. 1 is a graph schematically showing a typical time-dependent change in fluorescent pulse intensity outputted from an inorganic scintillator.
Figure 2:
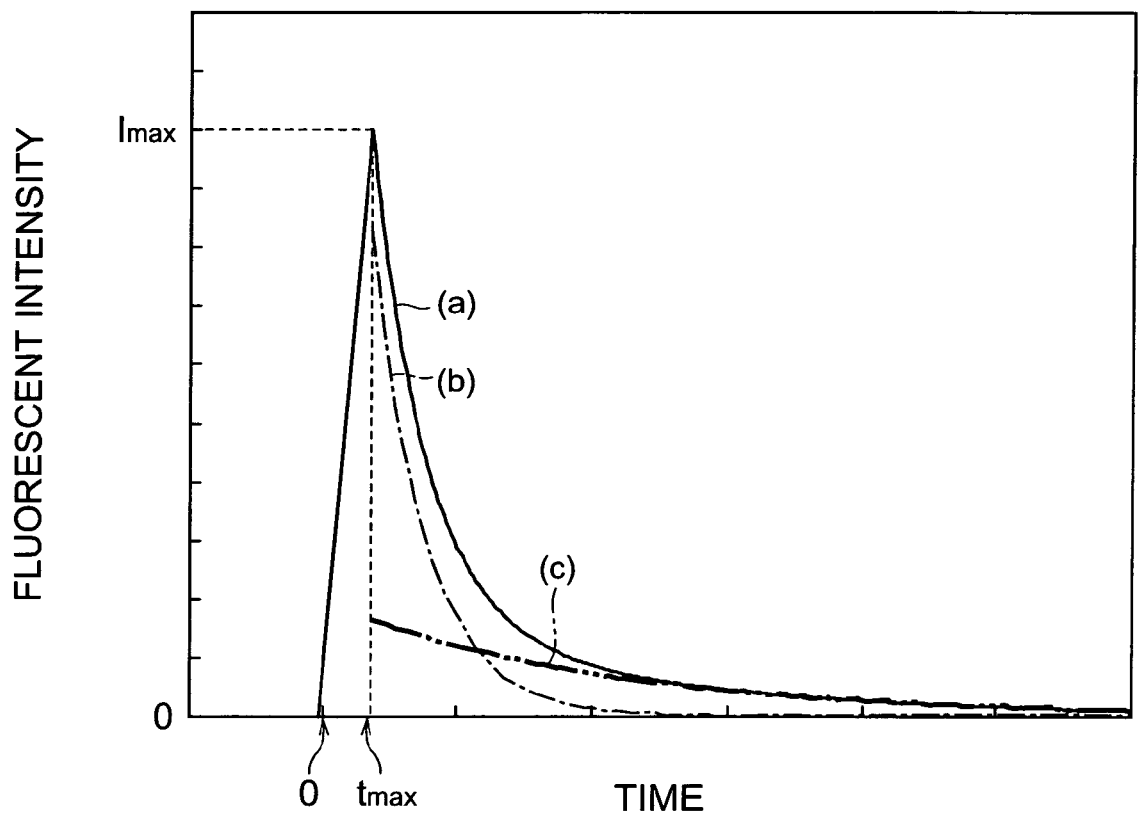
FIG. 2 is a schematic graph which illustrates resolution of two fluorescent components with different fluorescent lifetimes.

Preferred embodiments of the present invention will now be explained in detail with reference to the accompanying drawings as necessary. Throughout the drawings, corresponding elements will be indicated by like reference symbols and will be explained only once. Unless otherwise specified, the vertical and horizontal positional relationships are based on the positional relationships in the drawings. The dimensional proportions in the drawings are not restricted to the proportions shown.

An inorganic scintillator according to a preferred embodiment of the invention is an inorganic scintillator capable of producing scintillation by radiation, which is a single crystal comprising a metal oxide containing Lu, Gd, Ce and Si and belonging to space group C2/c monoclinic crystals, and by simultaneously satisfying the conditions specified by the following inequalities (1) and (2).

$$\{A_{Lu}/(A_{Lu}+A_{Gd})\} < 0.50 \qquad (1)$$

$$\{A_{Ce}/(A_{Lu}+A_{Gd})\} \geq 0.002 \qquad (2)$$

wherein $A_{Lu}$ represents the number of Lu atoms in the crystal, $A_{Gd}$ represents the number of Gd atoms in the crystal, and $A_{Ce}$ represents the number of Ce atoms in the crystal.

Lu includes approximately 2.6% of its radioactive isotope $^{176}$Lu as the natural abundance ratio, and the natural radiation of beta decay is a cause of noise when this element is used as a scintillator. From this viewpoint, therefore, a lower Lu content ratio in the inorganic scintillator is preferred.

The present inventors carried out detailed examination of an inorganic scintillator capable of producing scintillation by radiation, being a crystal comprising a metal oxide containing Lu, Gd, Ce and Si and belonging to space group C2/c monoclinic crystals, and satisfying the condition specified by the following inequality (1) (hereinafter referred to as "low Lu content inorganic scintillator"

$$\{A_{Lu}/(A_{Lu}+A_{Gd})\} < 0.50 \qquad (1)$$

As a result, it was found that the fluorescent pulse outputted upon incidence of a radiation pulse to the low Lu content inorganic scintillator consists of a first fluorescent component exhibiting a fluorescent lifetime of τ1 and a second fluorescent component exhibiting a fluorescent lifetime of τ2 which is longer than the fluorescent lifetime τ1.

Further research by the present inventors revealed that the lengths of the fluorescent lifetimes τ1 and τ2 depend on the Ce content ratio of the low Lu content inorganic scintillator. More specifically, it was demonstrated that increasing the Ce content ratio slightly lengthens the fluorescent lifetime τ1, while shortening the fluorescent lifetime τ2 roughly in inverse proportion to the Ce content ratio.

For example, when the inorganic scintillator is used in the detector of a PET apparatus, a shorter fluorescent lifetime is preferred for fluorescence outputted from the scintillator in order to enhance the energy time resolution. In particular, from the viewpoint of adequately increasing the energy time resolution and facilitating design of the electronic circuit of the detector, the relationship between the fluorescent lifetime τ1 and the fluorescent lifetime τ2 preferably satisfies the condition specified by the following inequality (4).

$$(\tau 2/\tau 1) \leq 8 \qquad (4)$$

From the same viewpoint, the relationship between the fluorescent lifetime τ1 and the fluorescent lifetime τ2 more preferably satisfies the condition specified by the following inequality (5).

$$(\tau 2/\tau 1) \leq 4 \qquad (5)$$

If the fluorescent decay time of the scintillator is long, extinction of the fluorescence outputted upon incidence of a radiation ray to the scintillator will be interrupted by the next incident radiation and its corresponding outputted fluorescence. This will prevent separate detection of the two radiation rays. In other words, the time resolution will be reduced. This phenomenon is known as "pile-up". In order to prevent such pile-up, the slower fluorescent component outputted from the scintillator (second fluorescent component) may be cut by an electronic circuit mounted in the detector of the PET apparatus. However, cutting of the fluorescent component by the electronic circuit may result in lower detection efficiency.

According to this embodiment, it is possible to adequately shorten the fluorescent decay time from the scintillator, thereby preventing pile-up and further enhancing the time resolution.

As a result of more detailed study by the present inventors it became clear that, in a low Lu content inorganic scintillator, in order for the relationship between the fluorescent lifetime τ1 and the fluorescent lifetime τ2 to satisfy the condition specified by the following inequality (4) it is necessary for the Ce content ratio to satisfy the condition specified by inequality (2) above. From the same viewpoint, the Ce content ratio preferably satisfies the condition specified by the following inequality (8).

$$0.005 \leq \{A_{Ce}/(A_{Lu}+A_{Gd})\} \quad (8)$$

From the standpoint of preventing coloration of the inorganic scintillator, the condition specified by the following inequality (9) is preferably satisfied.

$$\{A_{Ce}/(A_{Lu}+A_{Gd})\} \leq 0.02 \quad (9)$$

Considering all of the factors mentioned above, the inorganic scintillator of this embodiment more preferably satisfies the condition specified by the following inequality (3).

$$0.005 \leq \{A_{Ce}/(A_{Lu}+A_{Gd})\} \leq 0.02 \quad (3)$$

Throughout the present specification, "radiation" refers to particle rays (α rays, β rays, γ rays, X-rays, etc.) having sufficient energy to ionize atoms or molecules.

A preferred mode of a process for fabrication of an inorganic scintillator according to the invention (an example of a fabrication process for obtaining a rare earth silicic acid salt single crystal as a single crystal for a metal oxide) will now be explained.

The fabrication process for an inorganic scintillator according to this mode is a fabrication process for an inorganic scintillator which is a rare earth silicic acid salt single crystal comprising Lu, Gd, Ce and Si, and it comprises a melting step in which the raw material for the inorganic scintillator is brought to a molten state by a melting method to obtain a melt, a cooling and solidification step in which a portion of a seed crystal is dipped in the melt and the melt in which the seed crystal has been dipped is cooled to solidification to grow the crystal along a prescribed crystal plane of the seed crystal and obtain a single crystal ingot, and a cutting step in which the single crystal ingot is cut out to a prescribed shape and size.

From the standpoint of more reliably obtaining an inorganic scintillator according to this mode, the melting method in the melting step is preferably a Czochralski process. In this case, a lifting apparatus 10 having the construction shown in FIG. 3 is preferably used for the operation in the melting step and cooling and solidification step.

Figure 3:
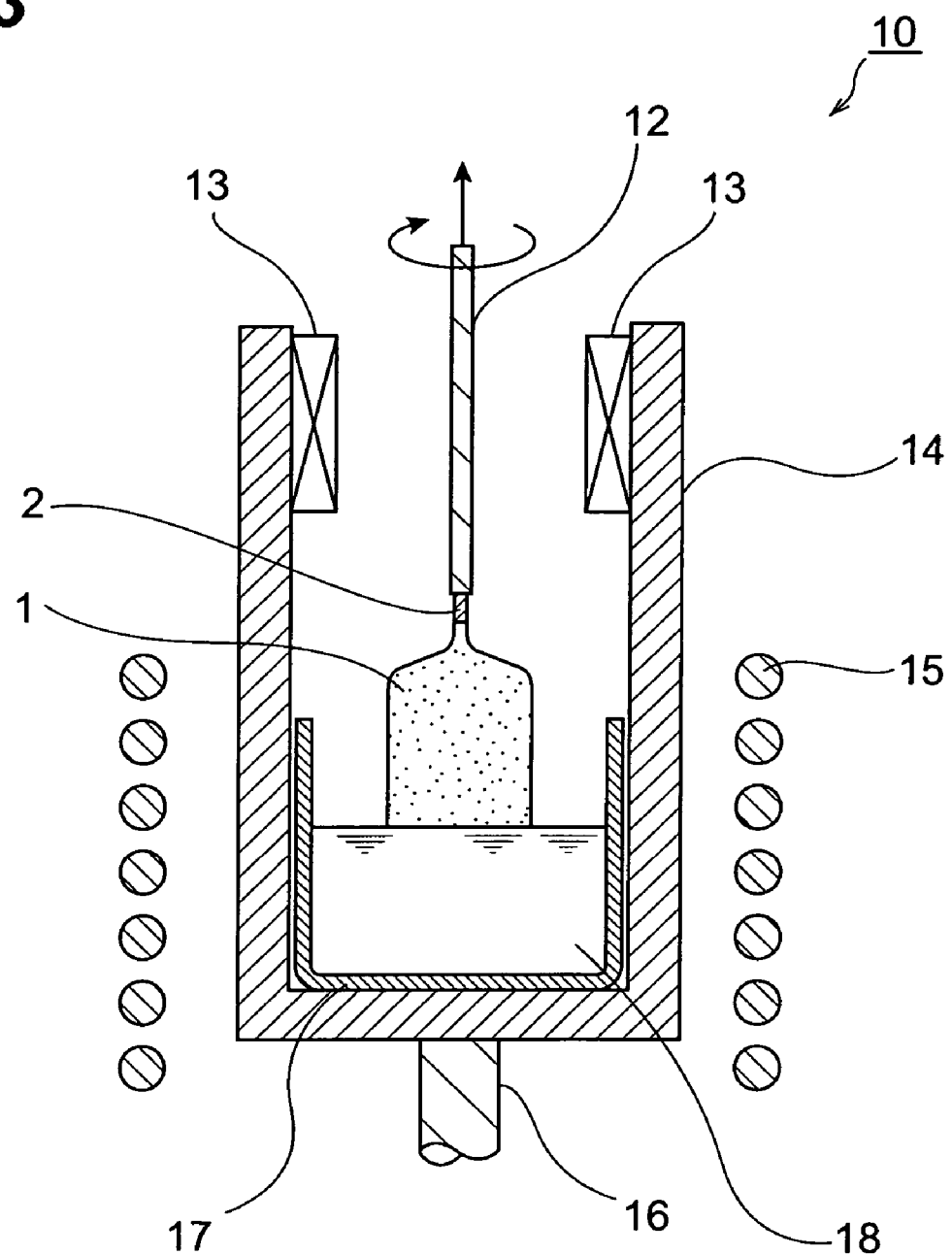
FIG. 3 is a schematic cross-sectional view showing an example of the basic construction of an apparatus for fabrication of an inorganic scintillator of the invention.

FIG. 3 is a schematic diagram showing an example of the basic construction of an apparatus for fabrication of an inorganic scintillator according to this embodiment.

The lifting apparatus 10 shown in FIG. 3 has a high-frequency induction heating furnace (two-zone hot growth furnace) 14. The high-frequency induction heating furnace 14 is used for continuous operation in the melting step and the cooling and solidification step described above.

The high-frequency induction heating furnace 14 is a refractory closed-bottom container with a cylindrical wall, and the shape of the closed-bottom container is the same as one used for single crystal growth based on the Czochralski process. A high-frequency induction coil 15 is wound on the outside of the bottom of the high-frequency induction heating furnace. Also, a crucible 17 (for example, a crucible made of Ir (iridium)) is set on the bottom inside the high-frequency induction heating furnace 14. The crucible 17 also serves as a high-frequency induction heater. The starting material for the inorganic scintillator is loaded into the crucible 17, and application of high-frequency induction by the high-frequency induction coil 15 heats the crucible 17 and produces a melt 18 composed of the constituent material of the inorganic scintillator.

A heater 13 (resistance heater) is also set at the top inner wall without contacting the melt 18 in the high-frequency induction heating furnace 14. This heater allows independent control of the heating output with respect to the high-frequency induction coil 15.

At the center bottom of the high-frequency induction heating furnace 14 there is provided an opening (not shown) which passes from the inside to the outside of the high-frequency induction heating furnace 14. Through this opening there is inserted a crucible support rod 16, from the outside of the high-frequency induction heating furnace 14, and the tip of the crucible support rod 16 is connected to the bottom of the crucible 17. Rotating the crucible support rod 16 allows the crucible 17 to be rotated in the high-frequency induction heating furnace 14. The area between the opening and the crucible support rod 16 is sealed with packing or the like.

A more specific fabrication method using a lifting apparatus 10 will now be explained.

First in the melting step, the starting material for the single crystal of the inorganic scintillator is loaded into the crucible 17, and application of high-frequency induction to the high-frequency induction coil 15 produces a melt 18 composed of the constituent material of the inorganic scintillator. The starting material for the single crystal may be, for example, a simple oxide of a rare earth metal or Si which is to compose the single crystal.

Next, in the cooling and solidification step, the melt is cooled to solidity to obtain a cylindrical inorganic scintillator single crystal ingot 1. More specifically, the operation proceeds through two steps, the growth step described below and a cooling step.

First, in the growth step, a lifting rod 12 having the seed crystal 2 anchored to the lower end is dipped into the melt 18 from the top of the high-frequency induction heating furnace, and then the lifting rod 12 is raised while forming the inorganic scintillator single crystal ingot 1. The heating output from the heater 13 is adjusted in the growth step, so that the inorganic scintillator single crystal ingot 1 raised from the melt 18 grows to have a cross-section with the prescribed diameter.

From the viewpoint of more reliably obtaining a single crystal belonging to the space group C2/c, the seed crystal serving as the nucleus of the single crystal ingot 1 is preferably a single crystal belonging to the space group C2/c. Specifically, the single crystal is more preferably a rare earth silicic acid salt single crystal, and more preferably one comprising Lu, Gd or Y as the rare earth element. Thus, it may include a rare earth silicic acid salt containing Lu and Gd, a rare earth silicic acid salt containing Y, a rare earth silicic acid salt containing Lu but containing essentially no Gd (i.e., containing Gd only as an avoidable impurity), or the like. Among such materials, using a single crystal composed of a rare earth silicic acid salt containing Lu and Gd as the seed crystal will allow the inorganic scintillator to be fabricated in a more reliable manner.

When the seed crystal used is a single crystal composed of a rare earth silicic acid salt containing Lu and Gd, the single crystal preferably satisfies the condition specified by the following inequality (10) from the standpoint of obtaining a scintillator exhibiting very excellent scintillation properties.

$$\{B_{Lu}/(B_{Lu}+B_{Gd})\}<0.50 \quad (10)$$

In formula (10), $B_{Lu}$ represents the number of Lu atoms in the seed crystal and $B_{Gd}$ represents the number of Gd atoms in the seed crystal.

Next, in the cooling step, the heating output of the heater is adjusted for cooling of the grown single crystal ingot (not shown) obtained after the growth step.

From the viewpoint of adequately preventing cracks in the single crystal and more reliably growing the single crystal of the inorganic scintillator, the gas phase in the high-frequency induction heating furnace 14 during the operation of the melting step and cooling and solidification step is preferably composed of a mixed gas whose major component is an inert gas satisfying the condition represented by the following inequality (11).

$$100\times\{G/(E+G)\}\leq 2.0(\%) \quad (11)$$

In formula (11), E represents the partial pressure of the inert gas in the mixed gas, and G represents the partial pressure of the oxygen gas in the mixed gas. According to the invention, "inert gas" means a noble gas or nitrogen gas.

If the value of $\{G/(E+G)\}$ exceeds 2.0%, more coloration will tend to be produced in the crystal, lowering the scintillator performance. If the value of $\{G/(E+G)\}$ exceeds 4.0%, and Ir is used as the constituent material of the crucible, vaporization of the structural material will proceed vigorously, hampering growth of the crystal.

Next, in the cutting step, the single crystal ingot 1 of the inorganic scintillator is cut to the prescribed shape and size to obtain an inorganic scintillator single crystal.

The above detailed explanation of a preferred mode of the invention is not intended to restrict the scope of the invention to this particular mode. For example, the inorganic scintillator of the invention may be polycrystalline in its solid state. If the inorganic scintillator of the invention is polycrystalline, it may be obtained by a sol-gel production process in the same manner as conventional polycrystalline scintillators.

EXAMPLES

The present invention will now be explained in greater detail through the following examples, with the understanding that these examples are in no way limitative on the invention.

Examples 1-12

In an Ir crucible having the same shape shown in FIG. 3 with a diameter of 50 mm, a height of 50 mm and a thickness of 1.5 mm there were loaded prescribed amounts of gadolinium oxide ($Gd_2O_3$, 99.99 wt % purity), lutetium oxide ($Lu_2O_3$, 99.99 wt % purity), silicon dioxide ($SiO_2$, 99.99 wt % purity) and cerium oxide ($CeO_2$, 99.99 wt % purity) as the starting materials, and 450-470 g of the mixture was obtained. The prescribed amount was changed for each example. The mixture was then heated to melting at 1950° C. or higher in a high-frequency induction heating furnace to obtain a melt (chemical composition of melt: $Ce_\alpha Lu_x Gd_{2-x-\alpha}SiO_5$) (melting step). Table 1 shows the proportions of $C_{Lu}$, $C_{Gd}$ and the number of Ce atoms (hereinafter abbreviated as "$C_{Ce}$") with respect to the total of the number of Lu atoms (hereinafter abbreviated as "$C_{Lu}$") and the number of Gd atoms (hereinafter abbreviated as "$C_{Gd}$") in the loaded starting material (hereinafter abbreviated as $C_{Lu}/(C_{Lu}+C_{Gd})$, $C_{Gd}/(C_{Lu}+C_{Gd})$ and $C_{Ce}/(C_{Lu}+C_{Gd})$, respectively).

Next, the end of the lifting rod to which the seed crystal was anchored was placed in the melt for crystal growth. The seed crystal used was a cut-out single crystal composed of a metal oxide containing Lu, Gd, Ce and Si, obtained by an ordinary crystal growth method. After growth of the single crystal and before its cutting (trimming), the crystal structure was confirmed to be a single crystal belonging to the space group C2/c using a powder X-ray diffraction apparatus (RAD™, product of Rigaku Corp.).

Next, a single crystal ingot with a neck diameter of 8 mmφ was lifted at a lifting speed of 3-10 mm/h to form a neck section. The cone section (cylinder trunk) was then lifted, initiating lifting of the cylinder trunk when the diameter reached 25 mmφ. The cylinder trunk was grown, and then the single crystal ingot was cut off from the melt and cooling was initiated. After completion of the cooling, the obtained single crystal was cut out (cooling and solidification step). The obtained single crystal ingot had a crystal mass of about 200-300 g.

TABLE 1

|  | Lu content ratio | Gd content ratio | Ce content ratio | τ1 <nanoseconds> | S1/(S1 + S2) | τ2 <nanoseconds> | S2/(S1 + S2) |
| --- | --- | --- | --- | --- | --- | --- | --- |
| Example 1 | 0.15 | 0.85 | 0.0005 | 35 | 0.21 | 1230 | 0.79 |
| Example 2 | 0.15 | 0.85 | 0.0025 | 55 | 0.29 | 300 | 0.71 |
| Example 3 | 0.20 | 0.80 | 0.0005 | 38 | 0.27 | 1020 | 0.73 |
| Example 4 | 0.20 | 0.80 | 0.0010 | 48 | 0.31 | 500 | 0.69 |
| Example 5 | 0.20 | 0.80 | 0.0025 | 41 | 0.27 | 250 | 0.73 |
| Example 6 | 0.20 | 0.80 | 0.0050 | 49 | 0.27 | 170 | 0.73 |
| Example 7 | 0.20 | 0.80 | 0.0100 | 50 | 0.60 | 100 | 0.40 |
| Example 8 | 0.25 | 0.75 | 0.0025 | 43 | 0.36 | 270 | 0.64 |
| Example 9 | 0.25 | 0.75 | 0.0050 | 50 | 0.41 | 190 | 0.59 |
| Example 10 | 0.30 | 0.70 | 0.0005 | 37 | 0.30 | 1010 | 0.70 |

TABLE 1-continued

|  | Lu content ratio | Gd content ratio | Ce content ratio | τ1 <nanoseconds> | S1/(S1 + S2) | τ2 <nanoseconds> | S2/(S1 + S2) |
|---|---|---|---|---|---|---|---|
| Example 11 | 0.30 | 0.70 | 0.0025 | 44 | 0.36 | 350 | 0.64 |
| Example 12 | 0.30 | 0.70 | 0.0050 | 50 | 0.41 | 190 | 0.59 |

Next, part of the bottom of the obtained single crystal was cut out and worked into powder. The resulting powder was combined with a silicon powder standard sample and the crystal structure was identified using a powder X-ray diffraction apparatus (RAD™, product of Rigaku Corp.). As a result, all of the single crystals of Examples 1-12 were confirmed to belong to the space group C2/c.

Next, an approximately cuboid sample (inorganic scintillator single crystal) with a size of 4 mm×6 mm×20 mm was cut out from the obtained single crystal ingot (cutting step). An inner perimeter cutter was used for the cutting, and the blade of the inner perimeter cutter was a blade electrodeposited with #325-400 natural diamond.

Polytetrafluoroethylene (PTFE) tape was covered as a reflective material onto five of the six sides of the (approximately cuboid) sample, excluding one of the sides with a size of 4 mm×6 mm (hereinafter referred to as "radiation incident side"). The sample was then placed with the radiation incident side lacking the PTFE tape covering positioned facing the photomultiplier side (photoelectric conversion side) of a photomultiplier tube (H1949™) by Hamamatsu Photonics and fixed using optical grease, as the inorganic scintillators of Examples 1-12. Each sample was irradiated with 611 KeV radiation using $^{137}$Cs, and the time-dependent change in fluorescent pulse output was measured using a digital oscilloscope (TDS3052™) by Techtronics.

As a result of the measurement, the rise times of the fluorescent pulses outputted from the inorganic scintillators of Examples 1-12 were all 1 nanosecond or shorter. Also all of the fluorescent pulses outputted from the inorganic scintillators of Examples 1-12 were composed of a first fluorescent component exhibiting a fluorescent lifetime τ1 and a second fluorescent component exhibiting a fluorescent lifetime τ2 longer than the fluorescent lifetime τ1. The fluorescent components were resolved in the manner described above, and the fluorescent lifetimes and the ratios between time-integrated values of intensity for the components were calculated by ordinary methods. The results are shown in Table 1. In Table 1, S1 is the time-integrated value of intensity for the first fluorescent component, and S2 is the time-integrated value of intensity for the second fluorescent component.

Figure 4:
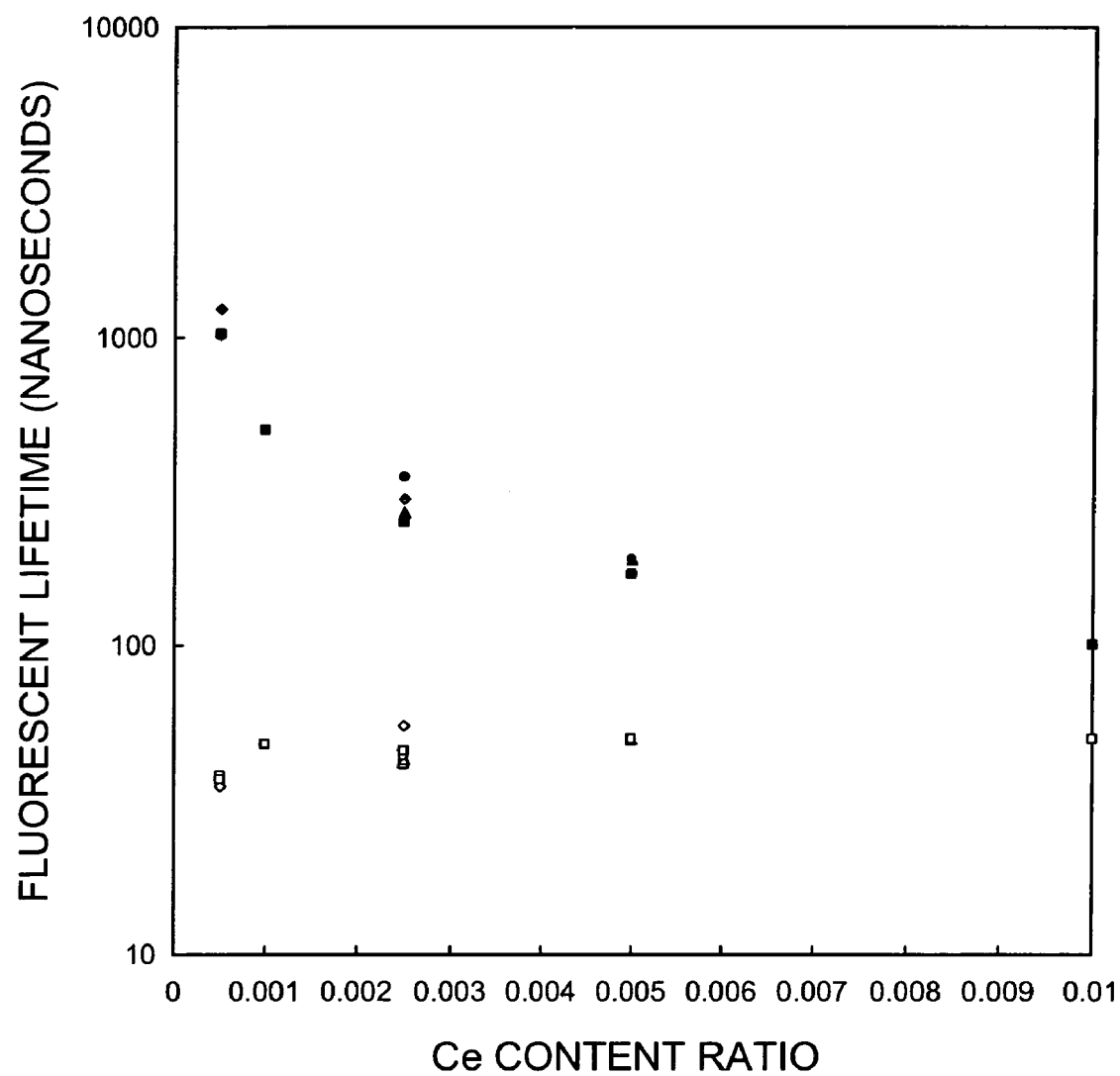
FIG. 4 is a graph showing the relationship between Ce content ratio and fluorescent lifetime for an inorganic scintillator according to an example of the invention.

The obtained results were plotted on a graph with Ce content ratio ($C_{Ce}/(C_{Lu}+C_{Gd})$) on the horizontal axis and fluorescent lifetime on the vertical axis. The results are shown in FIG. 4. In FIG. 4, inorganic scintillators with a Lu content ratio ($C_{Lu}/(C_{Lu}+C_{Gd})$) of 0.15 are represented by diamond plotted points, those with $C_{Lu}/(C_{Lu}+C_{Gd})$ of 0.20 are represented by square plotted points, those with $C_{Lu}/(C_{Lu}+C_{Gd})$ of 0.25 are represented by triangular plotted points and those with $C_{Lu}/(C_{Lu}+C_{Gd})$ of 0.30 are represented by circular plotted points. The black plotted points represent the first fluorescent components, and the white plotted points represent the second fluorescent components.

From FIG. 4 it is seen that for the inorganic scintillators of Examples 1-12, both the first fluorescent components and second fluorescent components had fluorescent lifetimes essentially independent of the Lu content ratio $C_{Lu}/(C_{Lu}+C_{Gd})$. Also, the fluorescent lifetimes of the second fluorescent components were slightly longer with increasing Ce content ratio ($C_{Ce}/(C_{Lu}+C_{Gd})$), while the fluorescent lifetimes of the first fluorescent components were shorter in approximately inverse proportion to the Ce content ratio.

In addition, it was shown that an inorganic scintillator with a Ce content ratio of 0.002 or greater has a (τ2/τ1) ratio of 7.5 or less. Also, an inorganic scintillator with a Ce content ratio of 0.005 or greater has a (τ2/τ1) ratio of 3.5 or less. When $C_{Ce}/(C_{Lu}+C_{Gd})$ is greater than 0.02, the crystal tends to exhibit darker coloration and crystal growth tends to be hampered.

Comparative Examples 1-5

In an Ir crucible having the same shape shown in FIG. 3 with a diameter of 50 mm, a height of 50 mm and a thickness of 1.5 mm there were loaded prescribed amounts of gadolinium oxide ($Gd_2O_3$, 99.99 wt % purity), silicon dioxide ($SiO_2$, 99.99 wt % purity) and cerium oxide ($CeO_2$, 99.99 wt % purity) as the starting materials, and 450-470 g of the mixture was obtained. The prescribed amount was changed for each comparative example. The mixture was then heated to melting at 1950° C. or higher in a high-frequency induction heating furnace to obtain a melt (chemical composition of melt: $Ce_\alpha Gd_{2-\alpha}SiO_5$). Table 2 shows the proportion of the number of Ce atoms (hereinafter abbreviated as "$C_{Ce}$") with respect to the total of the number of Lu atoms (hereinafter abbreviated as "$C_{Lu}$") and the number of Gd atoms (hereinafter abbreviated as "$C_{Gd}$") in the loaded starting material (hereinafter abbreviated as $C_{Ce}/(C_{Lu}+C_{Gd})$).

Next, the end of the lifting rod to which the seed crystal was anchored was placed in the melt for crystal growth. The seed crystal used was a cut-out single crystal composed of a metal oxide containing Gd, Ce and Si, obtained by an ordinary crystal growth method. After growth of the single crystal and before its cutting (trimming), the crystal structure was confirmed to be a single crystal belonging to the space group P2$_1$/c using a powder X-ray diffraction apparatus (RAD™, product of Rigaku Corp.).

Next, a single crystal ingot with a neck diameter of 8 mmϕ was lifted at a lifting speed of 3-10 mm/h to form a neck section. The cone section (cylinder trunk) was then lifted, initiating lifting of the cylinder trunk when the diameter reached 25 mmϕ. The cylinder trunk was grown, and then the single crystal ingot was cut off from the melt and cooling was initiated. After completion of the cooling, the obtained single crystal was cut out. The obtained single crystal ingot had a crystal mass of about 200-300 g.

TABLE 2

|  | Ce content ratio | τ1 <nano-seconds> | S1/ (S1 + S2) | τ2 <nano-seconds> | S2/ (S1 + S2) |
|---|---|---|---|---|---|
| Comp. Ex. 1 | 0.0005 | 190 | 0.85 | 1200 | 0.15 |
| Comp. Ex. 2 | 0.0025 | 56 | 0.85 | 600 | 0.15 |

TABLE 2-continued

| | Ce content ratio | τ1 <nano-seconds> | S1/ (S1 + S2) | τ2 <nano-seconds> | S2/ (S1 + S2) |
|---|---|---|---|---|---|
| Comp. Ex. 3 | 0.0050 | 40 | 0.85 | 418 | 0.15 |
| Comp. Ex. 4 | 0.0075 | 32 | 0.85 | 307 | 0.15 |
| Comp. Ex. 5 | 0.0100 | 27 | 0.85 | 215 | 0.15 |

Next, part of the bottom of the obtained single crystal was cut out and worked into powder. The resulting powder was combined with a silicon powder standard sample and the crystal structure was identified using a powder X-ray diffraction apparatus (RAD™, product of Rigaku Corp.). As a result, all of the single crystals of Comparative Examples 1-5 were confirmed to belong to the space group $P2_1/c$.

Next, an approximately cuboid sample (inorganic scintillator single crystal) with a size of 4 mm×6 mm×20 mm was cut out from the obtained single crystal ingot (cutting step). An inner perimeter cutter was used for the cutting, and the blade of the inner perimeter cutter was a blade electrodeposited with #325-400 natural diamond.

Polytetrafluoroethylene (PTFE) tape was covered as a reflective material onto five of the six sides of the (approximately cuboid) sample, excluding one of the sides with a size of 4 mm×6 mm (hereinafter referred to as "radiation incident side"). The sample was then placed with the radiation incident side lacking the PTFE tape covering positioned facing the photomultiplier side (photoelectric conversion side) of a photomultiplier tube (H1949™) by Hamamatsu Photonics and fixed using optical grease, as the inorganic scintillators of Comparative Examples 1-5. Each sample was irradiated with 611 KeV radiation using $^{137}$Cs, and the time-dependent change in fluorescent pulse output was measured using a digital oscilloscope (TDS3052™) by Techtronics.

As a result of the measurement, the rise times of the fluorescent pulses outputted from the inorganic scintillators of Comparative Examples 1-5 were all 5 nanoseconds or longer. Also all of the fluorescent pulses outputted from the inorganic scintillators of Comparative Examples 1-5 were composed of a first fluorescent component exhibiting a fluorescent lifetime τ1 and a second fluorescent component exhibiting a fluorescent lifetime τ2 longer than the fluorescent lifetime τ1. The fluorescent components were resolved in the manner described above, and the fluorescent lifetimes and the ratios between time-integrated values of intensity for the components were calculated by ordinary methods. The results are shown in Table 2. In Table 2, S1 is the time-integrated value of intensity for the first fluorescent component, and S2 is the time-integrated value of intensity for the second fluorescent component.

Figure 5:
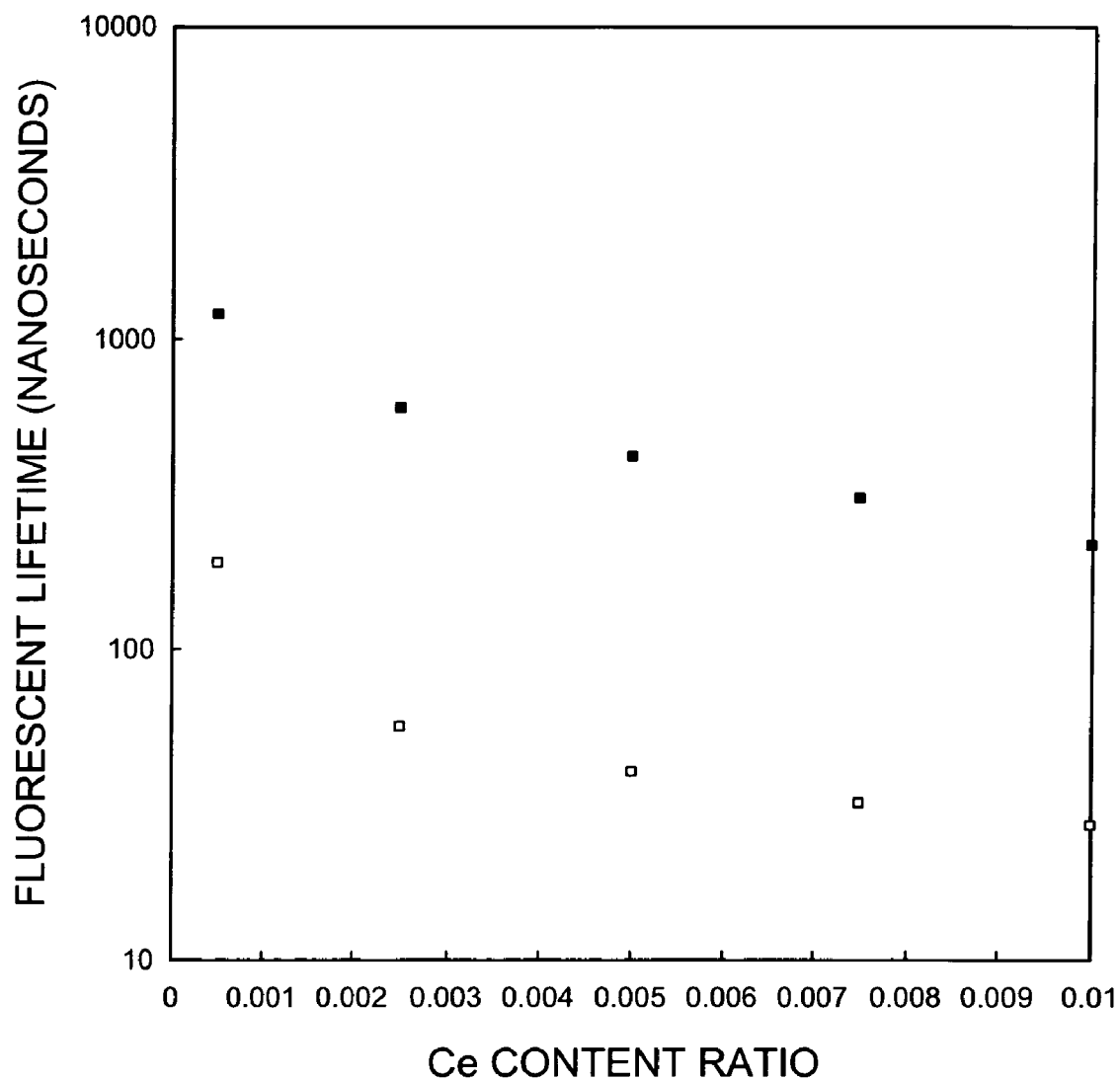
FIG. 5 is a graph showing the relationship between Ce content ratio and fluorescent lifetime for an inorganic scintillator according to a comparative example.

The obtained results were plotted on a graph with Ce content ratio ($C_{Ce}/(C_{Lu}+C_{Gd})$) on the horizontal axis and fluorescent lifetime on the vertical axis. The results are shown in FIG. 5. The black plotted points represent the first fluorescent components, and the white plotted points represent the second fluorescent components.

From FIG. 5 it is seen that the fluorescent lifetimes of the first fluorescent components and second fluorescent components were all shorter with higher Ce content ratios ($C_{Ce}/(C_{Lu}+C_{Gd})$) Also, (τ2/τ1) was virtually unchanged at approximately 10, regardless of the Ce content ratio.

What is claimed is:

1. An inorganic scintillator capable of producing scintillation by radiation, which is a crystal comprising a metal oxide containing Lu, Gd, Ce and Si and belonging to space group C2/c monoclinic crystals, and
    by simultaneously satisfying the conditions specified by the following inequalities (1) and (2),
    by outputting a fluorescent pulse, upon incidence of a radiation pulse to said inorganic scintillator, which is composed of a first fluorescent component exhibiting a fluorescent lifetime τ1 and a second fluorescent component exhibiting a fluorescent lifetime τ2 which is longer than the fluorescent lifetime τ1, and
    by simultaneously satisfying the conditions specified by the following inequalities (1) and (4), wherein $$\{A_{Lu}/(A_{Lu}+A_{Gd})\}<0.50 \quad (1)$$

$$0.02\geq\{A_{Ce}/(A_{Lu}+A_{Gd})\}\geq 0.002 \quad (2)$$

$$(\tau 2/\tau 1)\leq 8 \quad (4)$$

wherein $A_{Lu}$ represents the number of Lu atoms in said crystal, $A_{Gd}$ represents the number of Gd atoms in said crystal, and $A_{Ce}$ represents the number of Ce atoms in said crystal.

2. An inorganic scintillator according to claim 1 which satisfies the condition specified by the following inequality (3)

$$0.005\leq\{A_{Ce}/(A_{Lu}+A_{Gd})\}\leq 0.02 \quad (3).$$

3. An inorganic scintillator according to claim 1 which satisfies the condition specified by the following inequality (5)

$$(\tau 2/\tau 1)\leq 4 \quad (5).$$

4. An inorganic scintillator according to claim 1 which satisfies the condition specified by the following inequality (6)

$$\{(S1+S2)/S\}\geq 0.90 \quad (6)$$

wherein S is the time integrated value of the intensity of said fluorescent pulse as a whole, S1 is the time integrated value of said first fluorescent component intensity and S2 is the time integrated value of said second fluorescent component intensity.

5. An inorganic scintillator according to claim 4 which satisfies the condition specified by the following inequality (7)

$$0.10\leq\{S1/(S1+S2)\}\leq 0.90 \quad (7).$$

6. An inorganic scintillator according to claim 1, which is a single crystal.

7. An inorganic scintillator according to claim 1, wherein $0.15\leq\{A_{Lu}/(A_{Lu}+A_{Gd})\}<0.50$.

* * * * *